United States Patent
Gaudette et al.

(10) Patent No.: US 9,587,163 B2
(45) Date of Patent: Mar. 7, 2017

(54) SHAPE-CHANGE PARTICLE PLUG SYSTEM

(71) Applicants: Sean L. Gaudette, Katy, TX (US); Mark Kendall Adam, Houston, TX (US); Michael H. Johnson, Katy, TX (US)

(72) Inventors: Sean L. Gaudette, Katy, TX (US); Mark Kendall Adam, Houston, TX (US); Michael H. Johnson, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 355 days.

(21) Appl. No.: 14/096,670

(22) Filed: Dec. 4, 2013

(65) Prior Publication Data

US 2014/0216743 A1    Aug. 7, 2014

Related U.S. Application Data

(60) Provisional application No. 61/749,461, filed on Jan. 7, 2013.

(51) Int. Cl.
| | |
|---|---|
| *E21B 33/13* | (2006.01) |
| *E21B 43/12* | (2006.01) |
| *C09K 8/42* | (2006.01) |
| *E21B 33/138* | (2006.01) |
| *E21B 21/00* | (2006.01) |
| *C09K 8/50* | (2006.01) |

(52) U.S. Cl.
CPC ............... *C09K 8/426* (2013.01); *C09K 8/50* (2013.01); *E21B 21/003* (2013.01); *E21B 33/138* (2013.01)

(58) Field of Classification Search
CPC ........ E21B 33/10; E21B 43/261; E21B 43/12; E21B 33/13
USPC .......... 166/276, 279, 280.1, 280.2, 282, 285
See application file for complete search history.

(56) References Cited

U.S. PATENT DOCUMENTS

| | | | | |
|---|---|---|---|---|
| 5,476,543 A | * | 12/1995 | Ryan ...................... | C09K 8/516 106/218 |
| 6,169,058 B1 | * | 1/2001 | Le ........................... | C09K 8/62 166/308.4 |
| 7,013,979 B2 | | 3/2006 | Richard | |
| 7,104,317 B2 | | 9/2006 | Richard et al. | |
| 7,188,678 B2 | | 3/2007 | Richard et al. | |

(Continued)

FOREIGN PATENT DOCUMENTS

WO         2008151311         12/2008

OTHER PUBLICATIONS

International Search Report and Written Opinion; Date of Mailing Mar. 25, 2014, International Application No. PCT/US2013/074594, Korean Intellectual property Office, 11 pages.

*Primary Examiner* — Kenneth L Thompson
(74) *Attorney, Agent, or Firm* — Cantor Colburn LLP

(57) ABSTRACT

A method of inhibiting an undesirable fluid flow path, including pumping a flow of fluid downhole, the flow of fluid containing a plurality of shape-change particles; depositing the shape-change particles in an undesirable fluid flow path in a downhole structure; transitioning the shape-change particles from a first shape to a second shape; forming a plug with the shape-change particles when in the second shape; and inhibiting the undesirable fluid flow path from fluid flow therethrough with the plug of shape-change particles.

20 Claims, 1 Drawing Sheet

(56) References Cited

U.S. PATENT DOCUMENTS

| | | |
|---|---|---|
| 7,243,732 B2 | 7/2007 | Richard |
| 7,318,481 B2 | 1/2008 | Richard |
| 7,392,852 B2 | 7/2008 | Richard |
| 7,441,596 B2 | 10/2008 | Wood et al. |
| 7,527,095 B2 * | 5/2009 | Bloess ............... E21B 33/134 166/228 |
| 7,644,773 B2 | 1/2010 | Richard |
| 7,708,073 B2 | 5/2010 | Richard et al. |
| 7,866,393 B2 * | 1/2011 | Badalamenti ......... C04B 28/02 166/279 |
| 7,931,084 B2 * | 4/2011 | Nguyen ............... C09K 8/685 166/278 |
| 8,091,637 B2 * | 1/2012 | Fripp ................... C09K 8/80 166/278 |
| 8,307,916 B1 * | 11/2012 | Wald ................... E21B 21/003 166/292 |
| 8,381,813 B2 * | 2/2013 | Diaz ..................... C09K 8/518 166/286 |
| 2007/0240885 A1 | 10/2007 | O'Mally et al. |
| 2008/0017374 A1 * | 1/2008 | Surjaatmadja ....... C09K 8/5083 166/281 |
| 2008/0087431 A1 | 4/2008 | Willauer et al. |
| 2008/0108524 A1 * | 5/2008 | Willberg ............... C09K 8/035 507/225 |
| 2008/0296014 A1 | 12/2008 | Richard et al. |
| 2009/0000793 A1 | 1/2009 | Guillot et al. |
| 2009/0090559 A1 * | 4/2009 | Polizzotti ............... B29C 44/00 175/65 |
| 2010/0077594 A1 | 4/2010 | Richard |
| 2010/0193244 A1 * | 8/2010 | Hoskins ............... C09K 8/035 175/5 |
| 2011/0030954 A1 | 2/2011 | Allison et al. |
| 2011/0067872 A1 | 3/2011 | Agrawal |
| 2011/0162780 A1 | 7/2011 | Duan et al. |
| 2011/0168385 A1 | 7/2011 | O'Malley |
| 2011/0232901 A1 | 9/2011 | Carrejo et al. |
| 2011/0277996 A1 * | 11/2011 | Cullick ............... E21B 33/138 166/250.12 |
| 2011/0315226 A1 | 12/2011 | Xu et al. |
| 2012/0031612 A1 * | 2/2012 | Lembcke ............... C09K 8/516 166/278 |
| 2012/0247761 A1 | 10/2012 | O'Malley |

* cited by examiner

SHAPE-CHANGE PARTICLE PLUG SYSTEM

CROSS REFERENCE TO RELATED APPLICATIONS

This application is a Non Provisional application of U.S. Provisional Application Ser. No. 61/749,461 filed Jan. 7, 2013, the entire disclosure of which is incorporated herein by reference.

BACKGROUND

Fluids are pumped and utilized for a variety of tasks in the downhole drilling and completions industry. Valves, seals, packers, and other fluid flow control devices, mechanisms, and tools are utilized to promote the desired control and performance of fluid flows. One problem faced by the industry is when undesirable fluid flow paths or leaks form in various downhole structures, such as borehole walls, tubular strings, packers, joints, etc. For example, additives, e.g., loss circulation materials (LCM), are often added to drilling mud to prevent fluid loss into the surrounding formation during drilling. The industry would well receive advances and alternatives in solutions for sealing or otherwise inhibiting undesirable downhole fluid paths.

SUMMARY

A method of inhibiting an undesirable fluid flow path, including pumping a flow of fluid downhole, the flow of fluid containing a plurality of shape-change particles; depositing the shape-change particles in an undesirable fluid flow path in a downhole structure; transitioning the shape-change particles from a first shape to a second shape; forming a plug with the shape-change particles when in the second shape; and inhibiting the undesirable fluid flow path from fluid flow therethrough with the plug of shape-change particles.

A system for inhibiting a fluid flow path in a downhole structure, including a plurality of shape-change particles; a fluid containing the plurality of shape-change particles dispersed therein, the fluid configured to convey the shape-change particles to a downhole structure, the shape-change particles operatively arranged to transition between a first shape and a second shape upon exposure to a corresponding transition stimulus, the shape-change particles operatively arranged to flow into a fluid flow path at least partially defined by the downhole structure when in the first shape and to together form a plug to inhibit fluid flow through the fluid flow path when in the second shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
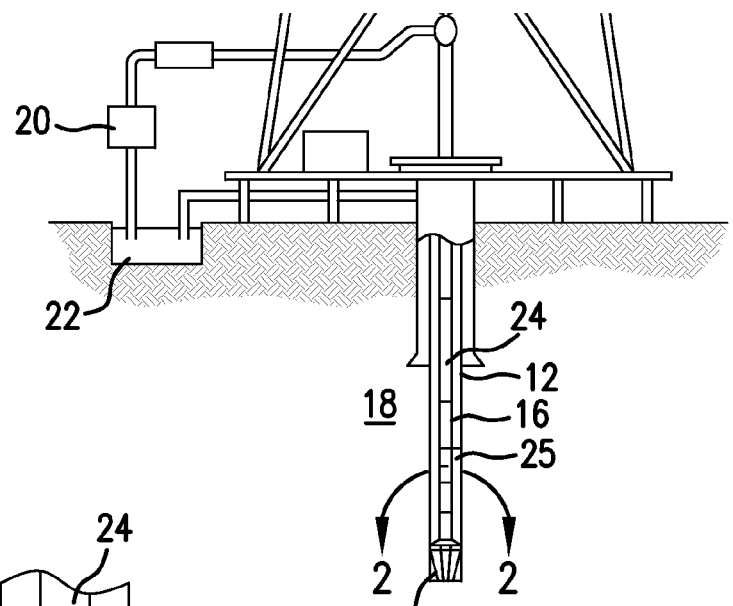
FIG. 1 is a schematic view of a borehole drilling system.

Referring now to FIG. 1, a system 10 is shown for drilling a borehole 12 with a drill bit 14 at the end of a drill string 16. Specifically, the drill bit 14 is arranged for cutting through rock and other material of a subterranean formation 18. A pump 20 may be included for circulating drilling mud in the borehole 12, e.g., in order to cool the bit 14, prevent a premature kick of formation fluids, prevent collapse of the borehole 12, lubricate the drill string 16, move cuttings formed during drilling away from the bit 14, etc. Specifically, the pump 20 is arranged to pump drilling mud from a mud pit 22 or other reservoir downhole through an internal passageway 24 of the drill string 16, through openings in the bit 14, and back up into the mud pit 22 via an annulus 25 formed between the borehole 12 and the drill string 16.

Figure 2:
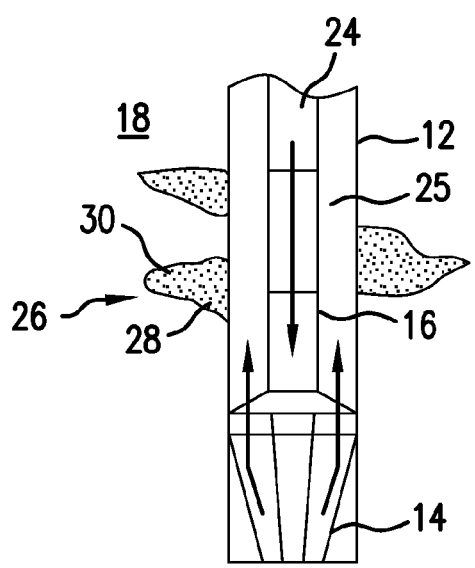
FIG. 2 is an enlarged view of a portion of a borehole being drilled by the system of FIG. 1 showing shape-change particles deposited in features of a formation.

One potential problem faced by the system 10 is fluid loss into the formation 18, e.g., via fluid permeable zones, formation fractures, etc. For example, FIG. 2 shows an enlarged view of the borehole 12, which has fractures, cracks, openings, or other features 26 therein that provide an undesirable fluid flow path or leak that results in the loss of fluid into the formation 18. In order to prevent the loss of fluid into the formation 18 via the features 26, the drilling mud can be provided with shape-changing particles 28. As will be appreciated in view of the below disclosure, fluid flow paths through downhole structures other than the borehole 12 can also be diverted, sealed, or otherwise inhibited by use of the particles 28. As used herein, the term "inhibited" is deemed to include all functions of the particles 28 discussed herein or which may be otherwise apparent to those with skill in the art, including blocking, stopping, diverting, sealing, impeding, separating, and the like. Additionally, any fluid or combination of fluids capable of having particulate, e.g., the particles 28, suspended or dispersed therein and capable of conveying the suspended or dispersed particulate to a downhole location could be utilized. These fluids could be used for or to assist in any downhole operation, process, or activity, such as treatment, stimulation, circulation, drilling, production, etc.

Figure 3:
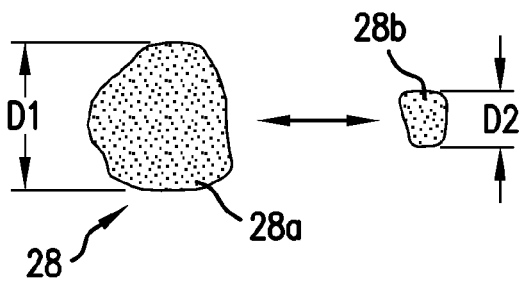
FIG. 3 illustrates a transition of a shape-change particle between original and deformed configurations according to one embodiment disclosed herein.

The particles 28 are arranged to transition between at least a first shape and a second shape upon exposure to a predetermined condition or stimulus. This may be referred to for the purposes of discussion herein as the "transition stimulus". For example, as shown in FIG. 3, the particles 28 can be arranged having an original or expanded configuration 28a having a dimension D1 and a compressed, compacted, or deformed configuration 28b having a dimension D2 smaller than the dimension D1. The transition stimulus could be related to a change in temperature, pH, magnetic field, electric current, etc.

In one embodiment, the particles 28 are shape memory foam particles. In a further embodiment, the shape memory foam is of the type made commercially available by Baker Hughes Incorporated under the trade name GEOFORM®. The shape memory foam can be arranged to transition from the compressed configuration 28b to the expanded configuration 28a if raised to a temperature above the glass transition temperature (Tg) of the shape memory foam. For example, the particles 28 can be formed from the GEOFORM® material mentioned above or another suitable material. The raw material may be provided in a sheet or other non-particulate form, in which case the material can be cut or shredded to form the particles 28 having the desired size and shape. The particles 28 may be prepared in the compressed configuration 28*b*, for example, by heating the particles above the Tg while in an original configuration that may resemble the expanded configuration 28*a*, (e.g., by submerging the particles in a warm fluid), and then compressing the particles 28, (e.g., by pressurizing the fluid), in order to achieve the configuration 28*b*. By subsequently cooling the particles 28 below Tg, the particles 28 will maintain the compressed configuration 28*b*, which is suitable for being pumped downhole, (e.g., by adding the particles 28 to the drilling mud circulated by the pump 20). As used herein, the expanded configuration 28*a* refers to the expanded form of the particle 28, without regard to the manner in which it was prepared. As used herein, the term "original configuration" applies to the expanded configuration 28*a*, as well as the initial form of the particle 28, without regard to whether or not the expanded configuration 28*a* resembles the size and shape of the initial form of the particle 28.

After being pumped downhole, the fluid that is lost through the features 26 will naturally draw the particles 28 into the features 26. The particles 28 will begin to revert to their original configurations upon exposure to their corresponding transition stimulus or condition, which could occur simultaneously with being pumped downhole and/or being deposited in the features 26, or a suitable amount of time thereafter. The transition stimulus or condition could relate to ambient downhole conditions, e.g., relatively high ambient downhole temperatures, in which case the particles 28 would begin transformation upon being pumped downhole. Alternatively, the transition stimulus is affected by an external input that may result in a controlled event, e.g., pumping a hot fluid downhole, triggering a device to create a magnetic field or electrical signal, etc.

In one embodiment, a catalyst or additive is provided with the particles 28 in order to temporarily disable or alter the response of the particles 28 to the transition stimulus. For example, in one embodiment, the additive raises the glass transition temperature of the particles 28 such that the particles 28 remain in the compacted configuration 28*b* for some time even after being exposed to the transition stimulus, e.g., relatively high ambient downhole temperatures. This is particularly advantageous as it delays the reversion of the particles 28 to the expanded configuration 28*a* until they have had an opportunity to fully pack into the features 26. Additionally, it prevents those of the particles 28 that return to surface from being reverting, e.g., so that they can be reused or recycled. Regardless of how triggered, the particles 28 attempting to revert to their expanded configurations 28*a* will result in the particles 28 expanding and exerting contact pressure on each other and becoming tightly packed together in the features 26. The packing of the particles 28 and exertion of contact pressure on each other forms a plug 30 that inhibits the undesirable fluid flow by at least partially blocking the fluid path through the features 26, thereby preventing undesired fluid loss.

It is noted that the particles 28 could have varying compressed and/or original sizes, e.g., in order to increase the packing efficiency of the particles into leaks and other undesired fluid paths for improving the fluid inhibiting capabilities of the plug 30. The shape-changing particles 28 could be used in addition to or in lieu of traditional loss circulation materials, such as flakes, fibers, etc. The aforementioned shape-memory foam could be a closed cell foam to enable the undesired fluid flow path to be sealed off when the particles are grouped together as a plug. Open cell foams could be used if the particles are of a size to enable them to be suitably densely packed.

Figure 4:
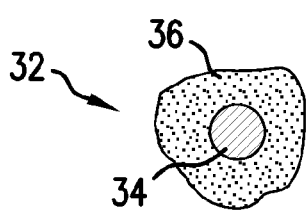
FIG. 4 schematically shows a particle having a core and an outer jacket.

In one embodiment shown in FIG. 4, a shape-changing particle 32 is shown. This particle 32 resembles the particle 28 with the exception that it has a core 34 surrounded by a jacket 36. The particle 32 could be configured such that the jacket 36 is a shape-change material that undergoes a transition between a compressed configuration (similarly to the configuration 28*b*) and an original or expanded configuration (similarly to the configuration 28*a*). The properties of the core 34 can be set to change the behavior of the particles 32 and/or the plug that results from the particles 32 packing together and changing shape. For example, the core 34 could be a relatively rigid material such as a ceramic, metal, or composite, that increases the mass, density, rigidity of the particles 32 or a plug formed therefrom, e.g., for enabling better stability when packed together as a plug. In one embodiment, ones of the cores 34 without the jackets 36 (e.g., proppant particles) could be pumped with the particles 32, the particles 28, etc., in order to add rigidity and stability. In one embodiment, the cores 34 could also be a shape-memory material that undergoes a transition between two shapes upon exposure to a transition stimulus or condition.

Figure 5:
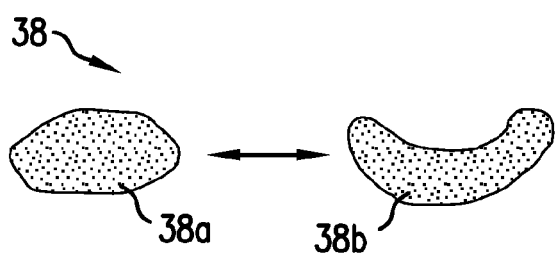
FIG. 5 illustrates a transition of a shape-change particle between original and deformed configurations according to another embodiment disclosed herein.

In one embodiment, the change in shape is not an enlargement of size as depicted for the particles 28 in FIG. 3. Instead, for example, a shape-change particle 38 in FIG. 5 is shown transitioning between an original configuration 38*a* substantially resembling an ellipsoid, and a deformed configuration 38*b* substantially resembling a crescent or banana. When converted to the deformed configuration 38*b*, the particles 38 will attempt to wrap around each other, thereby inter-engaging and interlocking with each other. This inter-engagement or interlocking can be used to increase the stability of a plug formed from the particles 38, as well as its fluid flow inhibiting capabilities. It is to be appreciated that the particles could revert to other irregular shapes having extensions, arms, protrusions, projections, etc. to form an interlocked or inter-engaged plug, e.g., resembling dog bones or barbells, jacks, 'Y's, 'L's, 'X's, helixes, etc. Wires, fibers, flakes, etc., (e.g., loss circulation materials) could also be added, even if not shape-changing, in order to assist in the interlocking.

It is to be understood that the various particles discussed herein, e.g., the particles 28, 32, and 38 are generally interchangeable with each other, e.g., with the particles 32 and 38 being used essentially as described herein with respect to the particles 28. Additionally, it is to be noted that combinations of the various particles described herein could be used together.

The shape-changing particles discussed herein could have any desired size. In some embodiments, the particles may be on the range of microns or smaller, while in other embodiments the particles may be in the order of centimeters or larger, depending on the particular application. Of course, particles of various sizes could be included together, e.g., to increase the packing efficiency of the particles before and after reversion to the original configuration, and thus, the fluid sealing capability of the resulting plug.

It is to be appreciated that other downhole structures could have undesirable fluid flow or leak paths that are inhibited by forming a plug with a plurality of pumpable shape-changing particles as described herein. For example, in one embodiment the particles are be pumped about or within a screen and then triggered to form a plug to fill or block the fluid permeable mesh or filter of the screen. This could be used to block off a defective screen, or to stop production from and/or circulation to a zone which is not desired to be in fluid communication with the rest of the completion system. In this embodiment, the particles can be sized so that they do not pass through the mesh or filter of the screen, and instead become lodged in or against the screen before expanding to fill the screen.

In various embodiments, the pumpable shape-changing particles of the present disclosure are used to stop a leak or alter flow in connection with one or more features. For example, in one embodiment, the particles are pumped to fill a leak in a tubular string, e.g., at a joint between sections of the string. In one embodiment, the particles are pumped to inhibit undesirable flow through a packer that is damaged or defective. In one embodiment, the particles are pumped to block a passage through which a control line or cable is run, e.g., in order to bypass a tool, packer, etc. In another embodiment, the particles are pumped to inhibit undesirable flow through a leaking or damaged casing or liner. In another embodiment, the particles are pumped into the annulus of a liner tieback to stop or prevent leakage. Thus, the particles according to the embodiments described herein could be used to inhibit fluid flow through these and any other downhole structure in which an undesirable fluid flow path may form or be formed.

Additional embodiments of the present disclosure may be apparent to those in this or related fields. For example, the pumpable shape-changing particles of the present disclosure may be configured to provide a permeable barrier as desired. This permeable barrier may be effectuated by using open cell foams and/or by altering the packing efficiency of the particles when expanded by controlling the size of the particles.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for inhibiting a fluid flow path in a downhole structure, comprising:
    a plurality of shape-change particles; and
    a fluid containing the plurality of shape-change particles formed from a shape change material dispersed therein, the fluid configured to convey the shape-change particles to a downhole structure, the shape-change particles operatively arranged to transition between a first shape and a second shape upon exposure of the shape change material to a transition stimulus representing a change in at least one downhole condition defined by one or more of a change in temperature, a change in magnetic field, and a change in electric current, the shape-change particles operatively arranged to flow into a fluid flow path at least partially defined by the downhole structure when in the first shape, and operatively arranged to form a plug to inhibit fluid flow through the fluid flow path when at least a portion of the plurality of shape-change particles in the second shape are positioned in the fluid flow path.

2. The system of claim 1, wherein the downhole structure includes a borehole.

3. The system of claim 1, wherein the downhole structure includes a packer.

4. The system of claim 1, wherein the downhole structure includes a tubular string, a casing, a liner, or a liner tieback.

5. The system of claim 1, wherein the downhole structure includes a screen.

6. The system of claim 1, wherein the transition stimulus is a downhole fluid.

7. The system of claim 1, wherein the transition stimulus is a downhole condition.

8. The system of claim 1, wherein the transition stimulus is a controlled event.

9. The system of claim 1, wherein the shape-change particles are shape memory foam particles.

10. The system of claim 1, wherein the second shape has greater dimensions than the first shape.

11. The system of claim 1, wherein the second shape is operatively arranged to cause the shape-change particles to interlock with each other during transition from the first shape.

12. The system of claim 1, wherein the second shape does not resemble the first shape.

13. The system of claim 12, wherein the first shape is circular or ellipsoidal, and the second shape is irregular, curved, protruding, or a combination including at least one of the foregoing.

14. The system of claim 1, wherein the shape-change particles include a core surrounded by a jacket, at least one of the core and the jacket being able to change shape.

15. The system of claim 1, wherein the flow of fluid is drilling mud and the system is a borehole drilling system.

16. A method of inhibiting an undesirable fluid flow path, comprising:
    pumping a flow of fluid downhole, the flow of fluid containing a plurality of shape-change particles;
    depositing the shape-change particles formed from a shape change material in an undesirable fluid flow path in a downhole structure;
    exposing the shape change material to a transitioning stimulus representing a change in at least one downhole condition defined by one or more of a change in temperature, a change in magnetic field, and a change in electric current causing the shape-change particles to transition from a first shape to a second shape;
    forming a plug with the shape-change particles when in the second shape; and
    inhibiting the undesirable fluid flow path from fluid flow therethrough with the plug of shape-change particles.

17. The method of claim 16, wherein the downhole structure includes a borehole.

18. The method of claim 16, wherein the flow of fluid is drilling mud.

19. The method of claim 16, wherein transitioning the shape-change particles includes increasing a size of the shape-change particles, the second shape being larger than the first shape.

20. The method of claim 16, wherein the second shape is operatively arranged to enable the shape-change particles to interlock together and forming the plug includes interlocking the shape-change particles together during the transitioning.

* * * * *